US007007104B1

(12) United States Patent
Lewis et al.

(10) Patent No.: US 7,007,104 B1
(45) Date of Patent: *Feb. 28, 2006

(54) METHOD AND APPARATUS FOR INTEGRATED NETWORK MANAGEMENT AND SYSTEMS MANAGEMENT IN COMMUNICATIONS NETWORKS

(75) Inventors: Lundy Lewis, Mason, NH (US); David St. Onge, Pepperell, MA (US); Ruchika Mehta, Latham, NY (US)

(73) Assignee: Aprisma Management Technologies, Inc., Durham, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/481,643

(22) Filed: Jan. 12, 2000

Related U.S. Application Data

(63) Continuation of application No. 08/649,278, filed on May 17, 1996.

(51) Int. Cl.
*G06F 15/16* (2006.01)
*G06F 15/173* (2006.01)

(52) U.S. Cl. .................... 709/246; 709/206; 709/207; 709/223; 709/224; 709/230

(58) Field of Classification Search ................ 709/207, 709/250, 230, 228, 206, 223, 224, 246; 370/401, 370/410; 340/825.02
See application file for complete search history.

(56) References Cited

U.S. PATENT DOCUMENTS

| | | | |
|---|---|---|---|
| 3,036,290 A | | 5/1962 | Zarouni |
| 4,622,545 A | | 11/1986 | Atkinson |
| 5,079,765 A | * | 1/1992 | Nakamura .................. 370/401 |
| 5,107,497 A | | 4/1992 | Lirov et al. |
| 5,123,017 A | | 6/1992 | Simpkins et al. |
| 5,125,091 A | | 6/1992 | Staas et al. |
| 5,133,075 A | | 7/1992 | Risch |
| 5,226,120 A | | 7/1993 | Brown et al. |
| 5,317,568 A | * | 5/1994 | Bixby et al. ................. 370/401 |
| 5,321,837 A | | 6/1994 | Daniel et al. |
| 5,450,408 A | * | 9/1995 | Phaal ..................... 340/825.02 |
| 5,473,608 A | * | 12/1995 | Gagne et al. ................ 370/401 |
| 5,640,505 A | | 6/1997 | Hearn et al. |
| 5,651,006 A | | 7/1997 | Fujino et al. |
| 5,680,552 A | * | 10/1997 | Netravali et al. ........... 370/401 |

(Continued)

FOREIGN PATENT DOCUMENTS

EP 0 621 716 A2 10/1994

(Continued)

OTHER PUBLICATIONS

Adler, R., et al. Opera-An Expert Operations Analyst for a Distributed Computer System. IEEE. 1998; 179-85.

(Continued)

*Primary Examiner*—Joseph Feild
*Assistant Examiner*—Chau Nguyen
(74) *Attorney, Agent, or Firm*—Pillsbury Winthrop Shaw Pittman LLP

(57) ABSTRACT

A computer system includes a gateway which provides integration between a network management platform and a system management platform. Such a gateway facilitates sharing of network management and system management events and alarms, as well as sharing of network management and system management display views. From the shared events and alarms, each platform may correlate such shared events and alarms with other data available to the platform. Thus, each platform has the advantage of using its own data in combination with data from the other platform to more effectively perform its functionality.

37 Claims, 13 Drawing Sheets

U.S. PATENT DOCUMENTS

| | | | | |
|---|---|---|---|---|
| 5,764,955 | A | * | 6/1998 | Doolan ........................ 709/223 |
| 6,026,091 | A | * | 2/2000 | Christie et al. ............. 370/410 |
| 6,131,112 | A | * | 10/2000 | Lewis et al. ................. 709/207 |

FOREIGN PATENT DOCUMENTS

| | | | |
|---|---|---|---|
| EP | 0 632 617 A2 | | 1/1995 |
| WO | WO 94/23514 | | 10/1994 |
| WO | WO 9423514 | * | 10/1994 |
| WO | WO 95/08794 | | 3/1995 |
| WO | WO 9508794 | * | 3/1995 |

OTHER PUBLICATIONS

Aguilar, L. "NCMA: A Management Architecture that Integrates Enterprise Network Assets, Integrated Network Management I." in Meandzija et al., eds., *Integrated Network Management, I*, IFIP 1989; 27-39.

Amsel, E. "Network Security and Access Controls." *Expert Systems Applications in Integrated Network Management.* Elsevier Science Publishers, Ltd. 1988, 346-58.

Aprisma Management Technologies, Inc. v. Micromuse, Inc. USDC NH 02cv559 "Day 1: Transcript of Markman Hearing" October 28, 2004, pp. 1-114.

Aprisma Management Technologies, Inc. v. Micromuse, Inc. USDC NH 02cv559 "Day 2: Transcript of Markman" Nov. 4, 1004, pp.1-103.

Aprisma Management Technologies, Inc. v. Micromuse, Inc. USDC NH 02cv559 "Deposition of Leonard J. Forys" Jul.15, 2004, pp.1-311.

Aprisma Management Technologies, Inc. v. Micromuse, Inc. USDC NH 02v559 "Videotaped Deposition of Mani Subramanian" July 22, 2004, pp.1-226.

Aprisma Management Technologies, Inc. v. Micromuse, Inc. USDC NH 02cv559 "Memorandum and Order" Jan. 11, 2005, pp.1-33.

Aprisma Management Technologies, Inc. v. Micromuse, Inc. USDC NH 02cv559 "Rule 26(a) Report of Mani Subramanian" Jun. 4, 2004, pp.1-28 and Exhibits A-H.

Aprisma Management Technologies, Inc. v. Micromuse, Inc. USDC NH 02cv559 "Declaration of Leonard J. Forys" Jan. 11, 2005, pp.1-122 and Attachments 1-8.

Barker, L.K., et al. "Security Standards - Government and Commercial." AT&T. 1988; 327-363.

Bauer. "NIDX, An Expert System for Real Time Network Intrusion Detection." IEEE 1988; 372-380.

Ben-Artzi, A. "Architecture for a Multi-Vendor Network Management" in Meandzija et al., eds., *Integrated Network Mangement, I*, IFIP 1989; 445-53.

Benz, C., et al. "A High Level Specification Technique for Modeling Names and their Environments Including Semantic Aspects." in Hegering et al., eds., *Integrated Network Management III*, IFIP. 1993; 29-43.

Boutaba, R., et al. "An Architectural Approach for Integrated Network and Systems Management." ACM SIGCOMM Computer Communication Review 1995 25(5): 13-38.

Braden, R.T. "A Pseudo Machine for Packet Monitoring and Statistics." ACM SIGCOMM Computer Communication Review 1988; 18(4): 199-208.

Buga, W.J. "Management of Telecommunications Services Provided by Multiple Carriers" in Krishnan, Il et al., eds. *Integrated Network Management II* IFIP 1991; 343-55.

"Chapter 7, Security Management Applications." 319-26.

Coates, J. "Artificial Intelligence: Observations on Applications and Control." Expert Systems Applications in Integrated Network Management. Computer Security Institute 1988 350-358.

Crawford, J.L. "Graphics for Network Management: An Interactive Approach." in Meandzija et al., eds., *Integrated Network Mangement,I*, IFIP 1989; 197-208.

Day, C., et al. "Subnetwork Root Cause Alarm System Analysis-An Element Management Layer (EML) Operations Application." IEEE. 1994; 343-57.

Deng, R.H., et al. "A Probabilistic Approach to Fault Diagnosis in Linear Lightwave Networks." 1992 May; 1-22.

DeSalvo, D.A. "Knowledge Acquisition for Knowledge Based Systems." in Liebowitz, J., ed. *Expert System Applications to Telecommunications* Wiley, John and Sons, 1988, 267-303.

Embry, J., et al. "An Open Network Management Architacture, OSI/NM Forum Architecture and Concepts." IEEE Network Magazine. 1990 Jul; 14-22.

Ericson, E. C., et al. *Expert Systems Applications in Integrated Network Management.* Artech House Telecommunications Library. 1989 JUn; 1-345.

Feldkhun, L.,et al. "Event Management as a Common Functional Area of Open Systems Management." in Meandzija et al., eds., *Integrated Network Mangement. I.*IFIP 1989; 365-76.

Feldkhun, L., et al. "Integrated Network Management Systems (A Global Perspective in the Issue)" in Meandzija et al., eds., *Integrated Network Mangement, I*, IFIP 1989; 279-301.

Feridun, M., et al. "ANM: Automated Network Management System." IEEE Network. 1988 Mar; 2(2):13-9.

Filip, W., et al. "NetView in a Heterogeneous Environment: Implementation of an Experimental Agent Structure." in Hegering et al., eds., *Integrated Network Management III,* IFIP. 1993; 505-17.

Finkel, A., et al. "An Alarm Correlation for the Heterogeneous Networks." Network Management and Control. 1994; 2:281-90.

Forbus, K. "Intelligent Computer Aided Engineering." 1988 AAAL 413-26.

C. Gbaguidi, et al. "A Generic Service Management Architecture for Multimedia Multipoint Communications." IFIP IN '95, Copenhagen, Denmark, Aug. 95, 1-9.

George, J.A., et al. "The NAS Hierarchical Network Management System, Integrated Management System III." in Hegering et al., eds., *Integrated Network Management III,* IFIP. 1993, 301-12.

Goldman, J., et al. "Integrated Fault Management in Interconnected Networks" in Meandzija et al., eds., *Integrated Network Mangement, I* , IFIP 1989; 333-44.

Goldsmith, S., et al. "Enterprise Network Management " in Meandzija et al., eds., *Integrated Network Mangement, I,* IFIP 1989; 541-52.

Goldszmidt. "On Distributed System Management." *Proceedings of the 1993 conference of the Centre for Advanced Studies on Collaborative research: distributed computing - vol. 2*, IBM Press 1993 637-47.

Griffin, J. "A Fault Management Prototype for Ethernet LANs." 1-4.

Harter, G., et al. "An Accounting Service for Heterogeneous Distributed Environments." IEEE. 1988; 297-324.

Hätönen, K., et al. "Rule Discovery in Alarm Databases." University of Helsinki Department of Computer Science Publication No. C-1996-7 1996 Mar; 1-19.

Hegering, H-G., et al., eds. "Integrated Network and System Management, III" IFIP. 1993; 3-765.

Heywood, P. "A Cool Mom Makes It Easy." Data Communications 1995 Jan; 24(1):120-1.

Jander, M. "Real Distributed Management" Data Communications. 1995 Jan, 24(1):116-118.

Hughes, D., et al. "Minerva: An Event Based Model for Extensible Network Management." Proc Inet '93 1-7.

Hughes, D., et al. "Minerva: An Integrated Network Management System." AARNet Networkshop, Dec. 1992 1-7.

"Information Technology - Open Systems Interconnection - Systems Management: State Management Function." ISO/IEC 10164-2. 1993 Jun. 15; 1-23.

"Information Technology - Open Systems Interconnection. - Systems Management: Alarm Reporting Function." ISO/IEC 10164-4. 1992 Dec. 15; 1-18.

"Information Technology - Open Systems Interconnection - Systems Management: Event Report Management Function." ISO/IEC 10164-5. 1993 Jun. 15; 1-18.

"Information Processing Systems - Open Systems Interconnection - Basic Reference Model - Part 4: Management Framework." ISO/IEC 7498-4. 1989 Nov. 1 5; 1-9.

Jander, M. Rounding Out the Roster of SNMP Agents. Data Communications. 1995 Jan. 1; 24(1):119-21.

Jankauskas, L., et al. "Technical Control of the Digital Transmissions Facilities of the Defense Communications System." IEEE Transactions of Communications. 1980 Sep; COM28(9): 1516-23.

Jordaan, J., et al. "Event Correlationin Heterogeneous Networks Using the OSI Management Framework." in Hegering et al., eds., Integrated Network Management III, IFIP. 1993; 683-95.

Karp, B.C., et al. "The Secure Data Network System." AT&T. 1988; 337-45.

Kara, et al. "An Architecture for Integrated Network Management." IEEE. 1989; 191-5.

Katzela, I, et al. "Schemes for Fault Identification in Communication Networks." 1-32.

Kershenbaum, A., et al., eds. Network Management and Control Plenum Pblishing Corp. 1990; 1-448.

Klemba, K.S. "Openview's Architectural Models" in Meandzija et al., eds., Integrated Network Mangement, I, IFIP 1989; 565-72.

Klerer, S. "The OSI Management Architgecture: An Overview." IEEE. 1988 Mar; 76-84.

Kobayashi, Y. "Standardization Issues in Integration Network Management, Integrated Network Management I." in Meandzija et al., eds., Integrated Network Mangement, I, IFIP 1989; 79-90.

Kooijman, R. "Divide and Conquer in Network Management Using Event-Driven Network Area Agents." 1995 May 11; 1-10.

Kotkas, V., et al "Knowledge-Based Techniques for Network Management." Technical Report TRITA-IT R 1994 Mar. 29; 1-20.

Krishnan, I. et al., eds. Integrated Network Management II IFIP 19913-857.

Laffey, T.J., et al. "Real-Time Knowledge Based Sytems." AAAI. 1988; 132-50.

Lee, K-H. "A Distributed Network Management System." Global Telecommunications Conference, 1994. GLOBECOM '94. 'Communications: The Global Bridge'., IEEE 1994 548-52.

Leinwand, A., et al. Network Management: A Practical Perspective Addison-Wesley 1993 1-222.

Lewis, L. "A Case-Based Reasoning Approach to the Resolution of Faults in Communications Networks." in Hegering et al., eds., Integrated Network Management III, IFIP. 1993; 671-82.

Lewis, L. "AI and Intelligent Networks in the 1990's Into the $21^{th}$ Century." in Worldwide Intelligent Systems, Liegeowitz, J. et al., eds. 19995 Sep.; 109-224.

Lewis, L., et al. "Extending Trouble Ticket Systems to Fault Diagnostics." IEEE Network. 1993 Nov.; 44-51.

Liebowitz, J. Expert System Applications to Telecommunications. John Wiley & Sons. 1988; 3-371.

Lirov, et al. "Artificial Intelligence Modeling of Control Systems." Simulation Councils, Inc. 1988, 427-39.

Lusher, E. "An Expert System for Logistics Management." Al Expert 1988 31(9):46-53.

Mahler, D. "Multi-Vendor Network Management - The Realities." in Hegering et al., eds., Integrated Network Management III, IFIP. 1993; 711-20.

Margues, T.E. "A Sympton-Driven Expert System for Isolating and Correcting Network Faults." IEEE. 1988; 251-8.

Mazumdar, S., et al. "Knowledge-Based Monitoring of Integrated Networks." IFIP. 1989; 235-43.

Mathonet, R., et al. "DANTES: An Expert System for Real Time Networking Troubleshooting." 1987; 2 59-62.

Mazumdar, S. "Knowledge-Based Monitoring of Integrated Networks for Performance Management." Columbia University 1990; 1-228.

Meandzija et al., eds., Integrated Network Mangement, I, IFIP 1989; 3-666.

Micromuse. "Media: Press Releases and Articles."

Micromuse. "Netcool/Utilities Extend Power and Reach of SunNet Manager." Micromuse Press Release, Jun. 13, 1994.

Micromuse. "The Netcool/LegacyWatch Architecture" Micromuse. 1-2.

Moffett, J.D. "Chapter 17 - Specification of Management Policies and Discretionary Access Control." in Sloman, M., ed. Network and distributed systems management Addison-Wesley 1994 455-80.

Moffett, J.D. "Policy Hierarchies for Distributed Systems Management." IEEE JSAC Special Issue on Network Management. 1993 Dec.; 11(9):1-22.

Moffett, J.D. "User and Mechanism Views of Distributed Systems Management." IEEE/IOP/BCS Distributed Systems Engineering. 1993 Aug.; 1(1):1-16.

Murrill, B. "OMNIpoint: An Implementation Guide to Integrated Networked Information Systems Management" in Meandzija et al., eds., Integrated Network Mangement, I, IFIP 1989; 405-18.

Noren, C., et al. "Interfacing an Expert Shell to On-line Applications for Communications Equipment Configuration Management." Noren & Ericoson 1989; 182-91.

Oates, T. "Fault Identification in Computer Networks: A Review and a New Approach." Technical Report 95-113, University of Massachusetts at Amherst, Computer Science Department, 1995.

Olsen, L., et al. "Understanding Network Management with OOA." IEEE Network Magazine. 1990; 23-8.

Partridge, C., et al. "HMES Variable Definitions." Network Working Group RFC 1024. 1987 Oct.; retrieved from the internet at http;//www.fags.org/rfcs/rfc1024.html 1-74.

Peacock, D., et al. "Big Brother: a Network Services Expert." University of MIchigan 1988; 245-50.

Rabie, S., et al. "DAD: A Real-Time Expert System for Monitoring of Data Packet Networks." IEEE. 1988: 164-169.

"Requirements for Internet Hosts - Application and Support." Network Working Group RFC 1123, 1989 Oct, retrieved from the internet at http://www/itetf.org/rfc/rfc1123.txt. 1-87.

Roos, J., et al. "Modeling Management Policy Using Enriched Managed Objects." in Hegering et al., eds., *Integrated Network Management III,* IFIP. 207-15.

Rose, D., et al. "SNA Network Management Directions." IBM Systems Journal. 1988: 27(1): 3-14.

Rose, M. "Network Working Group, Request for Comments 1155, Performance Systems International and Hughs LAN Systems, Structure and Identification of Management Information for TCP/IP-Based Internets." 1990 May; retrieved from the internet at http:;www.fags.org/rfcs/rfc1155.html 1-22.

Rose M. "Network Working Group, Request for Comments 1158 Management Information Base for Netwok Management of TCP/IP-based Internets: MIB II." 1990 May; retreived from the internet at httpL//www.fags.org/frcs/rfc1158.html 1-133.

Schaerth, J.P. "Concept for Tactical Wide-Area Network HUB Management ." IEEE 1994 644-9.

Schaller, H.N. "A Concept for Hierarchical, Decentralized Management of Physical Configuration in the Internet." KiVS '95 Chemnitz. 1995 Feb. 20-24; 1-14.

Schönwalder, J., et al. "How to Keep Track of Your Network Configuration." 1993 LISA. 1993 Nov. 1-5; 101-6.

Sidou, D. "Behavior Simulation and Analysis Techniques for Management Action Policies (or Hints Towards the Integration of Management Action Policies within TIMS)." Karlsruhe, Sep. 20-21 1995 1-17.

Siegl, M.R., et al. "Hierarchical Network Management. A Concept and Its Prototype in SNMPv2." Proceedings JENC6 1995 122-1-10.

Skoog, R., et al. "Network Management and Control Mechanisms to Prevent Maliciously Induced Network Instability." retrieved from the internet at http://www.ee.umd.edu/~shayman/papers.d/noms 2002.pdf 1-13.

Sloman, M. "Chapter 16: Domains: A Framework for Structuring Management Policy." in *Network and Distributed Systems Management.* Addison-Wesley Publishing Company 1994; 433-53.

Sloman, M., et al. "Domain Management for Distributed Systems" IFIP. 1989; 505-16.

Sloman, M. "Chapter 16: Domains: A Framework for Structuring Management Policy." in *Network and Distributed Systems Management.* Addison-Wesley Publishing Company 1994; 433-53.

Sloman, M. "Policy Driven Management for Distributed Systems." Journal of Network and Systems Management. 1994. i-xx, 1-666.

Sloman, M. *Network and Distributed Systems Management.* Addison-Wesley Publishing Company. 1994. i-xx, 1-666.

Cabletron systems "Spectrum: Spectrophone User's Guide" Cabletron Systems 1997 i-xii, 1-1-A22.

Stamatelopoulous, F. et al. "A scaleable, platform-based architecture for multiple domain network management." 1995 June, retrieved from the internet at http://www.netmode.ntua.gr/papers/papers/manmib.pdf 9 pages.

Stamatelopoulous, F. et al. "Using a DBMS for Hierarchical Network Management." accepted for presentation at the Engineer Conference NETWORLD+INTEROP '95, Mar. 1995, retrieved from the internet at http://www.cs.umd.edu/~ nick/papers/2.fotis.pdf 10 pages.

Stevenson, D. "Network Management: What It Is and What It Isn't." NMS: Network Management Whitepaper. 1995; 1-26.

Strutt, C. "Distribution is an Enterprise Management Director, Integrated Network Management III." in Hegering et al., eds., *Integrated Network Management II,* IFIP. 1993; 223-45.

Summers, R., et al. "Potential Applications of Knowledge-based Methods to Computer Security." 1988 Dec. Computers and Secuirty 7(6):359-71.

Sutter, M.T., et al. "Designing Expert Systems for Real Time Diagnosis of Self-Correcting Networks." IEEE Network Magazine. 1988; 109-17.

Suzuki, M., et al. "Developments of Integrated Management System NETM Based on OSI Standards" in Krishnan, I. et al., eds. *Integrated Network Management II* IFIP 1991; 189-99.

Sylor, M. "Guidelines for Structuring Manageable Entities, Integrated Management Network I." in Meandzija et al., eds., *Integrated Network Mangement, I,* IFIP..1989; 169-83.

Terplan, D. *Communicaitons and Network Management.* Prentice Hall 1990; i-xviii, 1-702.

Tjaden, G., et al. "Integrated Network Management for Real-Time Operations." IEEE Network Magazine. 1991 Mar.; 10-5.

Vassila, A., et al. "Introducing Active Managed Objects for Effective and Autonomous Distributed Management." University College London 1995 Aug. 15 pages.

Wang, Z. "Model of Network Faults." in Meandzija et al., e ds., *Integrated Network Mangement, I,* IFIP 1989; 345-52.

Warrier, U., et al. "The Common Management Information Services and Protocol Over TCP/IP (CMOT)." Network Management Group RFC 1095. 1989 apr.; 1-67.

Warrier, U., et al. "Platform for Heterogeneious Interconnections Network Management" in Meandzila et al., eds., *Integrated Network Mangement, I,* IFIP 1989; 13-24.

Wies, R. "Policies in Network and Systems Management - Formal Definition and Architecture." Journal of Network and Systems Management. 1994; 3(1):63-83.

Wies, R. "Using a Classification of Management Policies for Policy Specification and Policy Transformation." IFIP/IEEE International Symposium on Integrated Network Management. 1995 May 1-5; 1-14.

Zadeh, L.A. "Outline of a New Approach to the Analysis of Complex Systems and Decision Processes." IEEE Transactions on Systems, Man, and Cybermetics. 1973 Jan.; SMC-3(1): 28-44.

Znaty, S., et al. "Network Management Viewpoints: A New Way of Encompassing the Network Management Complexity." NTT Telecommunications Network Laboratories 1994 Feb. 18 pages.

Aguilar, L. Using RPC for Distributed Systems Management in Krishnan, I. et al., eds. *Integrated Network Management II* IFIP 1991; 565-76.

Aprisma Management Technologies, Inc. v. Micromuse, Inc. USDC NH 02cv559 "Defendant Micromuse Inc.'s 3rd Supplemental Answers to Plaintiff's First Set of Interrogatories" May 6, 2004, pp.1-50.

Aprisma Management Technolobies, Inc. v. Micromuse, Inc. USDC NH 02cv559 "Second Amemded Answer to Complaint for Patent Infringement and Counterclaim" May 6, 2004, pp.1-14.

Cabletron's Spectrum Advanced Management System 3.0. "Network Management and Security, Real Distributed Management." Data Communications. 1995 Jan.; 116-8.

Callahan, P.H. "Expert Systems for AT&T Switched Network Maintenance." AT&T. 1988; 263-73.

Herman, P., et al. "A Question-Answering for the French Yellow Pages."

Kalantari, M., et al. "Network Management and Control Mechanisms to Prevent Maliciously Induced Network Instability."

Pagurk, B., et al. Knowledge Based Fault Location in Data Communicaiton Network. IEEE Networks. 1988; 235-44.

Rosenberg. " are Users Up in the Air Over Network Management." Network Management and Maintenence. 119.

"The OSI Management Architecture: An Overview."

ANSI X3. 135-1992, Revision and Consolidation of ANSI X3. 135-1989 and ANSI X3. 168-1989, American National Standard for Information Systems–Database Language–SQL. New York, New York: American National Institute, October 16, 1992.

Case, J., et al. "A Simple Network Management Protocol (SNMP)." Network Working Group. 1990 May; 1-36

Frish, I., et al. Network Management and Control, vol. 2. Plenum Press, 1993. i-x, 1-514.

Mazumdar, S. "Objective-Driven Monitoring." in Krishnan, Il et al., eds. *Integrated Network Management II* IFIP 1991; 653-857.

McCloghrie, K., et al. "Management Information Base for Network Management of TCP/IP-based Internets." Network Working Group. 1988 Aug.; 1-90.

"Network Management Operations." IEEE Network Magazine. 1991; 5(2).

Terplan, K. *Communication Networks Management, 2d. Edition,* Prentice Hall 1992 i-xviii, 1-702.

ISO/IEC 7498-4 International Standard,Information Processing Systems-Open Systems Interconnection-Basic REference Model-Part 4: Management Framework. Geneva: International Organization for Standardization, $1^{st}$ Ed., Nov. 15, 1989.

"Network Management Protocols." IEEE Network Magazine. 1988; 2(2).

Planning and Reference for NetView, Network Control Program, Virtual Telecommunications Access Method. Document Number SC31-6102-01, IBM Corp., 1992.

ISO/IEC 7498-4 International Standard, Information Processing Systems-Open Systems Interconnection-Basic Reference Model-Part 4: Management Framework. Geneva: International Organization for Standardization, $1^{st}$ Ed., Nov. 15, 1989; i-9v, 1-9.

"Network Management Protocols." IEEE Network Magazine. 1988; 2 (2): 1-66.

Planning and Reference for NetView, Network Control Program, Virtual Telecommunications Access Method. Document No. SC31-6102-01, IBM Corp., 1992; xx, 1-329.

* cited by examiner

| Host name or model name | SPECTRUM model handle | Model IP address | Probable Cause file | Cause code | Parent model handle |
|---|---|---|---|---|---|
| sparkplug | 0xe80007 | 134.141.145.64 | Prob01550000 | 0x1550000 | 0xe80004 |
| dolly | 0xe80674 | 134.141.145.174 | Prob01550001 | 0x1550001 | 0xe80004 |
| brat | 0xe80634 | 134.141.145.44 | Prob01550002 | 0x1550002 | 0xe80004 |

FIG. 9

METHOD AND APPARATUS FOR INTEGRATED NETWORK MANAGEMENT AND SYSTEMS MANAGEMENT IN COMMUNICATIONS NETWORKS

This application is a continuation of application Ser. No. 08/649,278, filed May 17, 1996, entitled METHOD AND APPARATUS FOR INTEGRATED NETWORK MANAGEMENT AND SYSTEMS MANAGEMENT IN COMMUNICATIONS NETWORKS, and now allowed.

BACKGROUND OF THE INVENTION

1. Field of the Invention

This invention relates generally to computer systems, and more particularly, to platforms that monitor communications networks, platforms that monitor computer system operation, and integration and sharing information between the two types of platforms.

2. Discussion of the Related Art

Computer networks are widely used to provide increased computing power, sharing of resources and communication between users. Networks may include a number of computer devices within a room, building or site that are connected by a high-speed local data link such as token ring, Ethernet, or the like. Local area networks (LANs) in different locations may be interconnected by for example packet switches, microwave links and satellite links to form a wide area network (WAN). A network may include several hundred or more connected devices, distributed across several geographical locations and belonging to several organizations.

In the operation and maintenance of computer networks, a number of issues arise, including traffic overload on parts of the network, optimum placement and interconnection of network resources, security, isolation of network faults, and the like. These issues become increasingly complex and difficult to understand and manage as the network becomes larger and more complex. For example, if a network device is not sending messages, it may be difficult to determine whether the fault is in the device itself, a data communication link, or an intermediate network device between the sending and receiving devices.

Network management platforms, also referred to as network management systems, are intended to resolve such issues. Older network management platforms typically operated by collecting large volumes of information which then required evaluation by a network administrator, and thus placed a tremendous burden on and required a highly skilled network administrator.

Newer network management platforms systematize the knowledge of the networking expert such that common problems of a single domain (i.e., a portion of the network under common management) can be detected, isolated and repaired, either automatically or with the involvement of less-skilled personnel. Such a platform typically includes a graphical representation of that portion of the network being monitored by the system. Alarms are generated to inform an external entity that an event has occurred and/or requires attention. Since a large network may have many such events occurring simultaneously, some network management platforms provide alarm filtering.

Commercially available network management platforms and applications for alarm filtering include: (1) SPECTRUM®, Cabletron Systems, Inc., 35 Industrial Way, Rochester, N.H. 03867; (2) HP OpenView, Hewlett Packard Corp., 3000 Hanover Street, Palo Alto, Calif. 94304; (3) LattisNet, Bay Networks, 4401 Great American Pkwy., Santa Clara, Calif. 95054; (4) IBM Netview/6000, IBM Corp., Old Orchard Road, Armonk, N.Y. 10504; and (5) SunNet Manager, SunConnect, 2550 Garcia Ave, Mountain View, Calif. 94043.

System management platforms have been developed to provide insight into the operation of a device or a set of devices which may or may not be included in a network managed by a network management platform. For example, a system management platform may provide a list of users that are currently logged onto the device, a list of logon attempts (including whether the logon attempt was successful, an identification of the user, and a time stamp), the number and status of disk partitions on a storage device within the device, indications of software applications that are currently running on the device, and file management information.

Examples of system management platforms include: (1) Tivoli, Tivoli Systems, Inc., 9442 Capital of Texas Highway North, Arboretum Plaza One, Suite 500, Austin Tex. 78759; (2) UniCenter, Computer Associates International, Inc., One Computer Associates Plaza, Islandia N.Y. 11788-7000; (3) Calypso, Calypso Software Systems, 25 Sundial Avenue, Suite 205, Manchester N.H. 03103; and (4) BMC, BMC Software, Inc., 2101 City West Blvd., Houston Tex. 77042-2827.

FIG. 1 depicts generally the relationship between a network management platform and a system management platform. In FIG. 1, a communications network 10 includes device 12A, device 12B, device 12C and device 14A, which are coupled together by interface 15. Additionally, device 12C is also coupled to device 12D, device 12E, and device 14B via communications interface 17.

As indicated by the dashed lines connecting the network management platform 21 to the communications network 10, the network management platform 21 monitors and manages aspects of the communications network 10 that relate to data communications. For example, the network management platform 21 may poll network devices, gather communications statistics, analyze data, perform fault isolation and false alarm suppression, provide alarms relating to communications to users or to other applications, as well as other functions relating to the communications network.

In contrast to the functions performed by the network management platform 21, the system management platform 19 monitors and manages individual devices 12A–E that are part of the communications network 10. For example, the system management platform 19 provides user administration, print management, software distribution, job scheduling, security, and data backup for the devices 12A–E.

The network management platform 21 and system management platform 19 may reside on different computers, or require a system administrator to view the display of each platform separately, thus making it cumbersome for the administrator to efficiently use both platforms. It would be desirable if a network management platform could provide information currently provided by a system management platform, or if a system management platform could provide information currently provided by a network management platform. Additionally, it would be desirable if each platform could use data from the other platform in combination with other data to more effectively monitor and manage the respective management aspects for which each platform is responsible.

SUMMARY OF THE INVENTION

According to one aspect of the invention, a gateway provides integration between a network management platform and a system management platform. Such a gateway facilitates sharing of network management and system management events and alarms, as well as sharing of network management and system management display views. From the shared events and alarms, each platform may correlate such shared events and alarms with other data available to the platform. Thus, each platform has the advantage of using its own data in combination with data from the other platform to more effectively perform its functionality.

One embodiment of the invention is directed to method for sharing information between a first management system and a second management system, the method comprising the steps of receiving a message from the first system, determining whether the message relates to an entity that is managed by the second management system, and formatting the message in a format compatible with the second management system when the message relates to an entity that is managed by the second management system. The method may also include notifying the second management system that a message is available from the first management system.

Another embodiment of the invention is directed to a system for providing an interface between a first management system and a second management system, comprising a correlator, a message formatter, and an interface module. The correlator has an input that receives a message from the first management system, and an output that provides a correlated message when the message is related to an entity managed by the second management system, and the message formatter has an input that receives the correlated message and an output that provides a formatted message that is compatible with the second management system. The interface module has an output that provides a notification to the second management system when the output of the message formatter provides the formatted message.

In any of the embodiments described above, the first management system may include a network management platform and the second management system may include a system management platform. The second management system may include a command line interface for invoking processes within the second management system, one of which may be invoked to notify the second management system that a message is available. Additionally, the formatted message may be sent to the second management system, which may include appending text of the message to a file that is accessible by the second management system, the file including a plurality of related messages, for example information relating to the entity that is managed by the second management system.

The severity of the message may also be determined, so that the message is formatted only when the severity is greater than a predetermined severity. Additionally, a display view may be provided from the first management system to the second management system, which may include invoking a software application that performs functions of the first management system.

BRIEF DESCRIPTION OF THE DRAWINGS

Other features and advantages of the present invention shall appear from the following description of an exemplary embodiment, said description being made with reference to the appended drawings, of which:

FIG. 9 shows an example of a correlation table such as that shown in FIG. 8;

DETAILED DESCRIPTION

In accordance with a specific embodiment of the present invention, a network management platform provides to a user data and views generated from data and views of a system management platform. Additionally, the network management platform provides data and views to the system management platform which the network management platform may then provide to a user. Each of the platforms may correlate the data received from the other platform to facilitate high-level insight into the operation of a network or of a computer system that has previously not been feasible without highly skilled human intervention.

Figure 1:
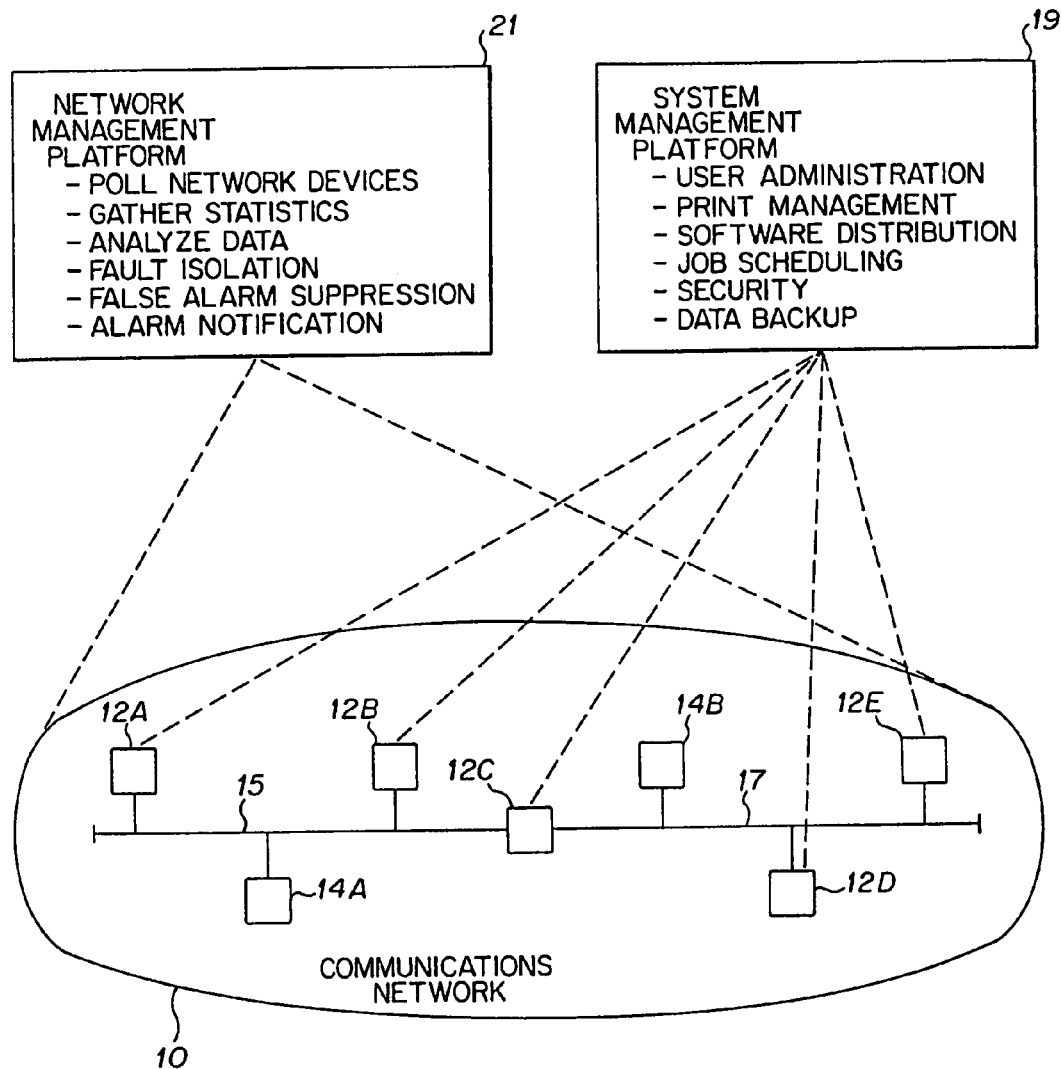
FIG. 1, described above, depicts the relationship between a network management platform and a system management platform.
Figure 2:
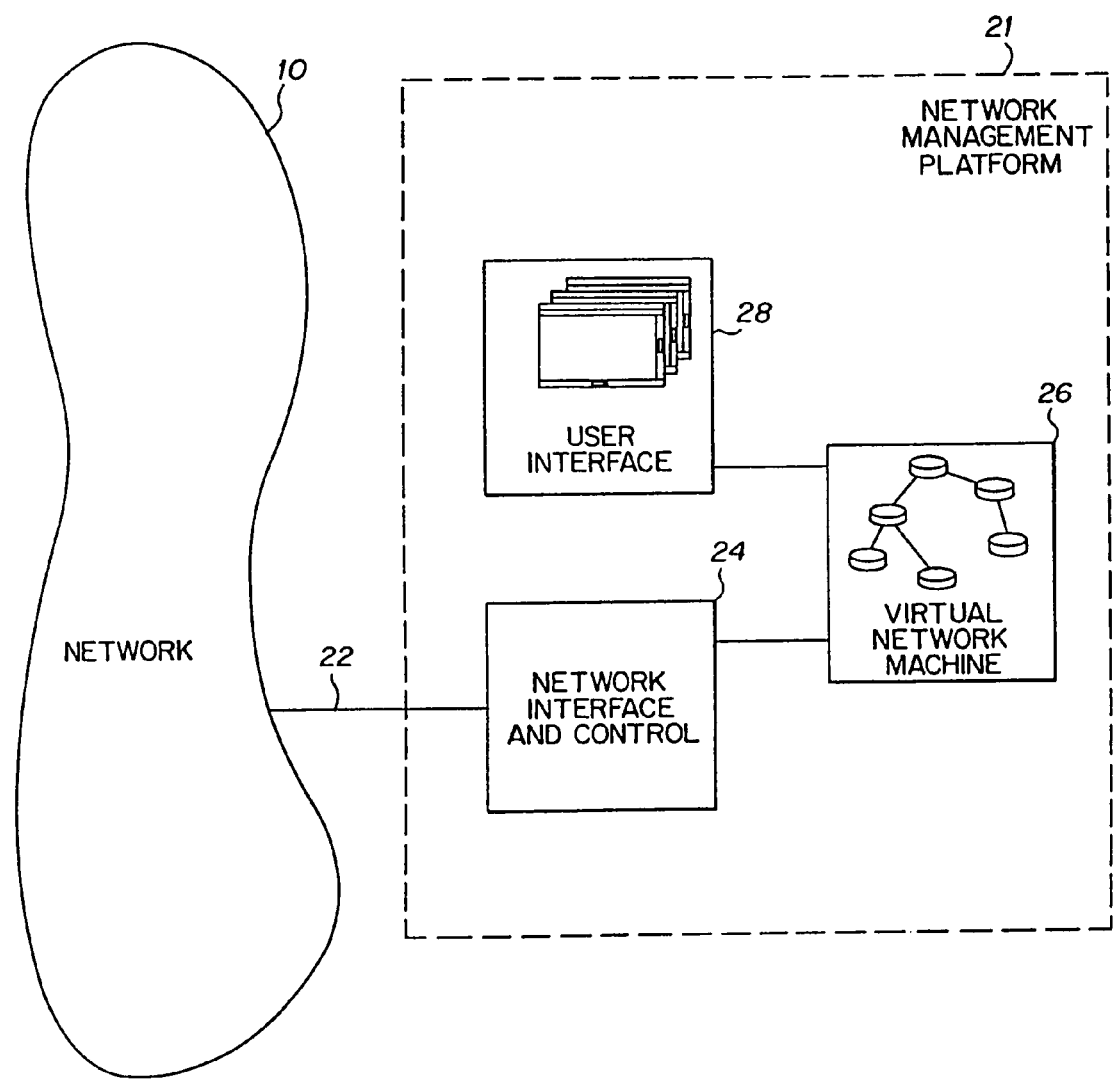
FIG. 2 is a schematic illustration of the relationship between a network and a network management platform.

FIG. 2 is a block diagram illustrating generally the arrangement of a network management platform (NMP) 21 which monitors a live network 10 via a communication interface 22. In one example, the network management platform 21 is SPECTRUM®, which includes a database of models relating to corresponding network entities and relationships among those entities. SPECTRUM includes a network interface and control module 24, a virtual network machine 26, and a user interface 28.

The SPECTRUM NMP continually monitors the network 10 and maintains a database of information about devices within the network 10. The devices, also referred to as network entities, include not only hardware devices such as personal computers (PCS), workstations, hubs, routers, bridges, and repeaters, but also software applications. An understanding of the present invention is furthered by an understanding of a model-based network management platform such as SPECTRUM, which is described in U.S. Pat. No. 5,261,044, issued Nov. 9, 1993 to R. Dev et al., and hereby incorporated by reference in its entirety. The SPECTRUM platform is commercially available and also described in various user manuals and literature available from Cabletron Systems, Inc., Rochester, N.H.

In summary, SPECTRUM is a system for maintaining and processing information pertaining to the condition of the computer network and providing the same to a user, the network including a plurality of network resources such as computer devices and software applications being executed on such devices. The system includes a virtual network machine 26, comprising a programmed digital computer, wherein a program is implemented using an object-oriented programming language such as C++, Eiffel, SmallTalk, and Ada. The virtual network machine 26 includes interrelated intelligent models of network entities and relations between network entities, including a capability for acquiring network data pertaining to the condition of a network entity from the corresponding network entity, and for those entities not capable of being contacted, inferring their status from the status of other entities. The virtual network machine 26 maintains objects which include network data relating to the corresponding network entity and one or more inference handlers for processing the network data, the inference handlers being responsive to changes occurring in the same and/or a different object. The network data can then be transferred to a user interface 28 coupled to the virtual network machine 26, for supplying the network data to a user.

Thus, the models may be implemented as software "objects" containing both "data" (attributes) relating to the corresponding network entity and one or more "inference handlers" (functions) for processing the data. See Grady Booch, "Object-Oriented Analysis And Design, With Applications," 2nd Edition, Benjamin/Cummings Publishing Co., Redwood City, Calif., Chapter 2 (1994). The inference handlers may be initiated by predetermined virtual network events, such as a change in specified network data in the same model, a change in specified network data in a different model, and predefined events or changes in models or model relations. Information pertaining to the condition of the network resource can be obtained from the network entity by polling the resource, can be automatically received from the network resource without polling, or can be inferred from data contained in other models. An alarm condition may be generated when the network data meets a predetermined criteria. Events, alarms and statistical information from the virtual network may be stored in a database to be selectively displayed for the user.

The data in the SPECTRUM database may be used for generating topological displays of the network, showing hierarchial relationships between network devices, isolating a network fault, reviewing statistical information, as well as other functions.

The SPECTRUM network management platform allows for collective management of autonomous local area networks (LANs), with equipment from different vendors. It complies with the current Simple Network Management Protocol (SNMP) standards, and can also accommodate other standard and proprietary protocols. The virtual network machine 26 preprocesses the raw information coming from the network entities through the network interface and control module 24 in order to construct a model of the network's current status and performance characteristics. Network entities that cannot be directly communicated with (e.g., cables and buildings) can infer their status from the status of the entities connected to or contained within them. The virtual network machine 26 provides a consistent interface for management applications to access any of the information in the model and thereby provides these applications with a unified view of the network 10.

In a SPECTRUM implementation, the SPECTROGRAPH® user interface 28 provides a highly graphical multi-perspective view into the network model. The user interface enables the user to navigate through a landscape in which cables, networks, local area networks and even rooms show up as icons, and which icons indicate the health and performance characteristics of those elements. Many of these icons can be further queried for additional information. The main function of the user interface 28 is to visually present to the user the model within the virtual network machine 26. It allows the user to navigate freely within the network model, only limited by the access rights assigned by the network administrator. The information can be accessed at varying degrees of detail, from a macro overview, down to the level of the devices and the cables which connect them. In addition to its navigation functions, the SPECTROGRAPH user interface provides an alarm management facility, an event log window, a reporting facility, a find facility, and other features.

Figure 3:
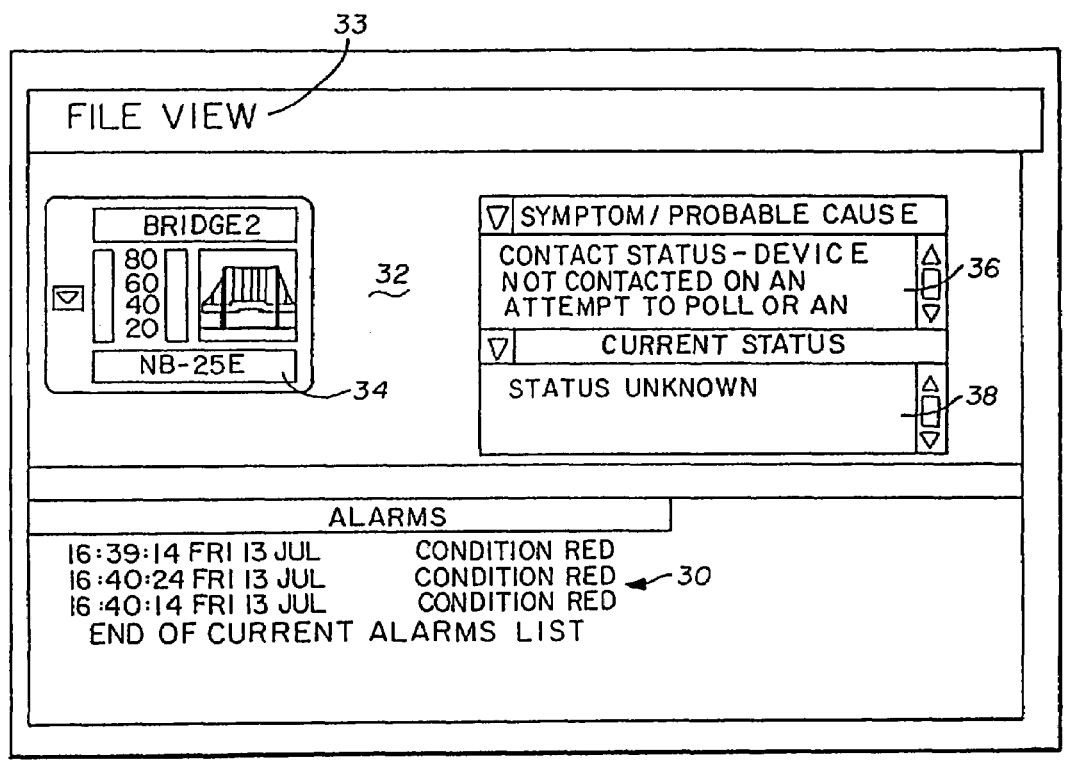
FIG. 3 is a view of a user interface of a network management platform such as that shown in FIG. 2.

An example of the alarm log view provided by the SPECTROGRAPH user interface 28 is illustrated in FIG. 3. The alarm log view 33 may include an area 30 for the listing of current alarms, and an area 32 for displaying information pertaining to a selected alarm. A user, such as a system administrator or a technician, may select a particular alarm in the listing of current alarms to obtain more information. A multi-function icon 34 representing the network device having the fault is displayed in area 32, with one or more text fields 36 and 38 which provide information regarding the cause of the alarm and the status of the device. By selecting specified areas of the icon 34, the user can obtain further information regarding the device for which an alarm is registered.

Alternatively, instead of or in combination with the user interface 28, information from the virtual network machine 26 may be provided directly to another computer program, or may be =provided to a user such as a system administrator via electronic mail or a telephone message that is automatically transmitted.

One method for fault management in large communications networks is to use a "trouble-ticketing" system. This system provides a number of tools for use by network users, administrators, and repair and maintenance personnel. The basic data structure, a trouble-ticket, has a number of fields in which a user can enter data describing the parameters of an observed network fault. A trouble-ticket filled out by a user may then be transmitted by, for example, an electronic mail system to maintenance and repair personnel. A trouble-ticket describing a current network fault requiring attention or action is referred to as an outstanding trouble-ticket. When the network fault has been corrected, the solution to the problem, typically called a resolution, is entered into an appropriate data field in the trouble-ticket and the trouble-ticket is classified as being completed. The system stores completed trouble-tickets in memory and thus a library of such tickets is created, allowing users, administrators, and maintenance and repair personnel to refer to the same for assistance in determining solutions to future network faults.

An example of a trouble-ticketing system is the ACTION REQUEST system, developed by Remedy Corporation, Mountain View, Calif., and sold by Cabletron Systems, Inc., Rochester, N.H. ARS Gateway™ is an application sold by Cabletron Systems, Inc., which incorporates the SPECTRUM and ACTION REQUEST Systems. The ARS GATEWAY application receives fault information from the SPECTRUM system and automatically generates and processes a trouble-ticket. The ARS GATEWAY application is further described in copending and commonly owned U.S. Ser. No. 08/023,972 filed Feb. 26, 1993 by Lundy Lewis, and entitled "Method and Apparatus For Resolving Faults In Communications Networks," which is hereby incorporated by reference in its entirety.

An improvement over prior network management platforms is implemented in SPECTRUM Alarm Notification Manager (SANM), which utilizes policy-based filters to create an alarm notification policy that may apply to alarms received from several instances of a network management platform. Such a system is further described in copending and commonly owned U.S. Ser. No. 08/412,955 filed Mar. 29, 1995 and Ser. No. 08/558,425 filed Nov. 16, 1995 by Arrowsmith et al., and entitled "Method and Apparatus For Policy-Based Alarm Notification in a Distributed Network Management Environment," and are hereby incorporated by reference in their entirety.

Figure 4:
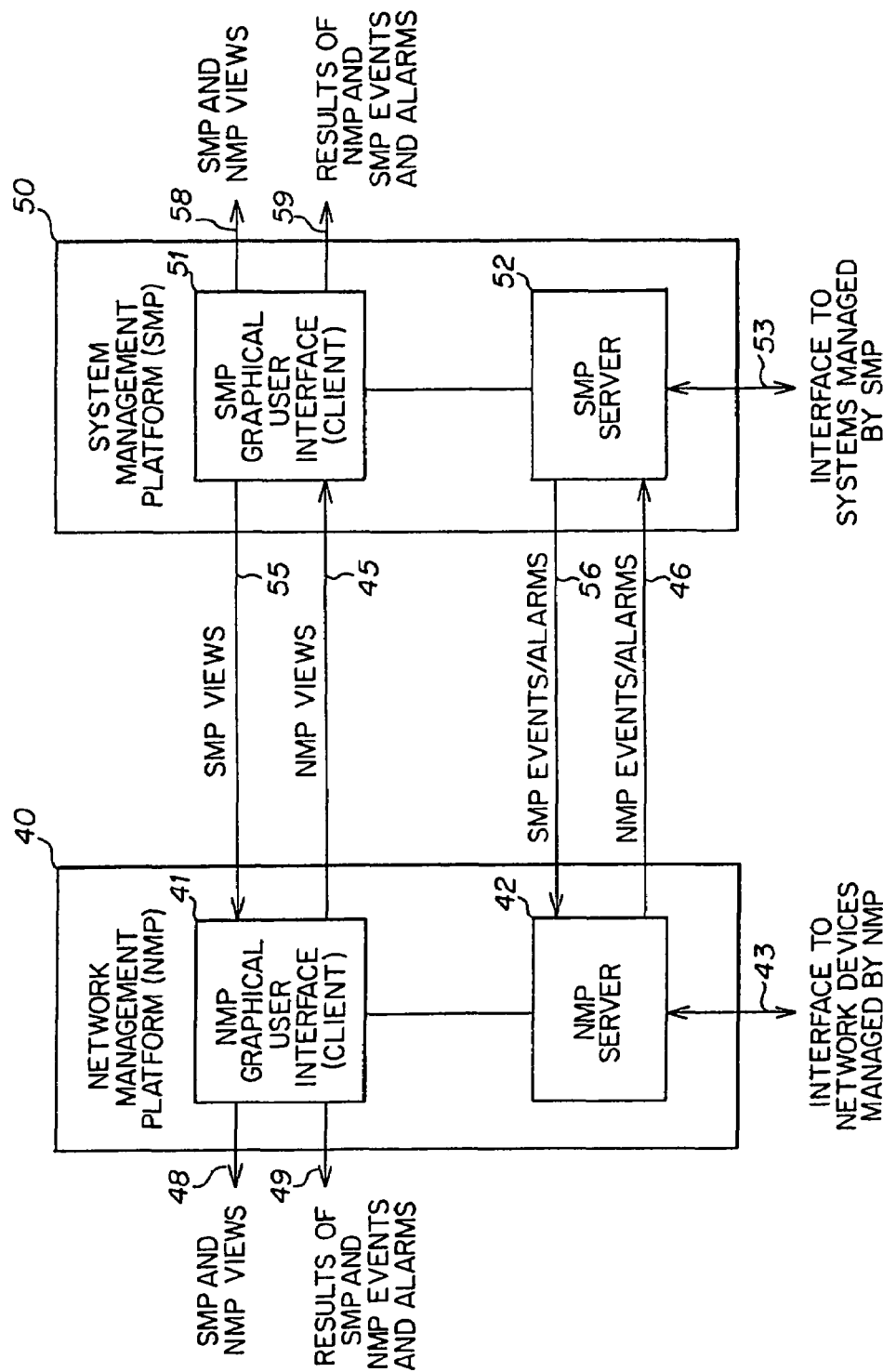
FIG. 4 illustrates an embodiment of the invention, in which a network management platform and a system management platform share events, alarms, and display views.

FIG. 4 illustrates an embodiment of the invention, in which a network management platform 40 and a system management platform 50 share information so that a network administrator, system administrator, or any other user can view all associated data from either one of the platforms 40, 50. Additionally, because each platform 40, 50 has access to its own data as well as the other platform's data, the quality of information provided to an administrator or external software application may be improved.

In particular, the network management platform (NMP) 40 includes an NMP graphical user interface (GUI) 41, which also may be referred to as a "client" in client-server technology. One embodiment of the NMP client 41 is SPECTROGRAPH described above. The NMP also includes an NMP server 42, one embodiment of which is SPECTROSERVER described above. The NMP 40 also includes interface 43 which couples to network devices and entities that are managed or monitored by the NMP 40.

The system management platform (SMP) 50 includes an SMP graphical user interface 51, also referred to as a "client," as well as an SMP server 52, and an interface 53 which couples to systems managed by the SMP 50.

As shown in FIG. 4, the NMP client 41 receives SMP views 55 from the SMP client 51, and the SMP client 51 receives NMP views 45 from the NMP client 41. One embodiment of the views 45, 55 include display data so that a display from one of the platforms may be recreated on a display from the other of the platforms. Accordingly, the NMP 40 can now provide both the NMP and SMP views 48, and the SMP 50 can now provide both the SMP and NMP views 58.

For example, the SMP 50 can display an NMP view such as that depicted in FIG. 3. Without the benefits of this invention, an administrator who was viewing a display of the SMP 50 would have had to log onto another computer in many circumstances to view a display of such an alarm view, or any other view of the NMP 40.

Additionally, the NMP server 42 receives SMP events and alarms 56 from the SMP server 52, and the SMP server 52 receives NMP events and alarms 46 from the NMP server 42. Each server 42, 52, can analyze this additional data and correlate it as required to provide analysis results that may not have been possible with each platform's respective data alone. For example, as a result of the reception and analysis of the SMP event and alarm data 56, the NMP server 42 may provide more detailed analysis data to the NMP client 41, so that the NMP 40 can provide the results of SMP and NMP events and alarms 49 to an administrator or external software application. Similarly, as a result of the reception and analysis of the NMP event and alarm data 46, the SMP server 52 may provide more detailed analysis data to the SMP client 51, so that the SMP 50 can provide the results of NMP and SMP events and alarms 59.

The results 49, 59 represent information for an administrator that was not previously available. For example, the SMP 50 may detect that a computer from the network 10 is not operating efficiently, e.g. processing jobs on the computer using data from a storage device are not being completed. The SMP 50 may not have any more information relating to the diagnosis of such a situation. However, the NMP 40 may be aware that a router in the communication path between the computer and the storage device has failed. If the NMP 40 provides this information (typically in the form of events or alarms) to the SMP 50, then the SMP 50 will have the information necessary to inform an administrator that the computer is operating correctly, and that it is only a router failure causing the processing jobs on the computer to go uncompleted. Without the integration of an SMP 40 and an NMP 50, such a correlation of data would not have been communicated to the administrator, and the administrator may have used significant time and resources to solve a non-existent problem within the computer itself.

Similarly, the NMP 40 may detect that a network entity is unreachable by other entities on the network 10, but may have no further information regarding this performance degradation. As a result, the NMP may cause alarms to be sent to an administrator and may also invoke fault isolation of the network 10. However, the SMP 50 may have information that the unreachable network entity has crashed (i.e., stopped operating) due to a corrupted disk partition, and may provide this information to the NMP 40. As a result of receiving this information, the NMP 40 will probably not send a network alarm to the administrator, and there is no need to fault isolate the network, because there is nothing wrong with the network itself. Instead, both the NMP 40 and the SMP 50 may provide accurate data, i.e. that a disk partition and not a network failure has caused an entity to be unreachable.

Figure 5:
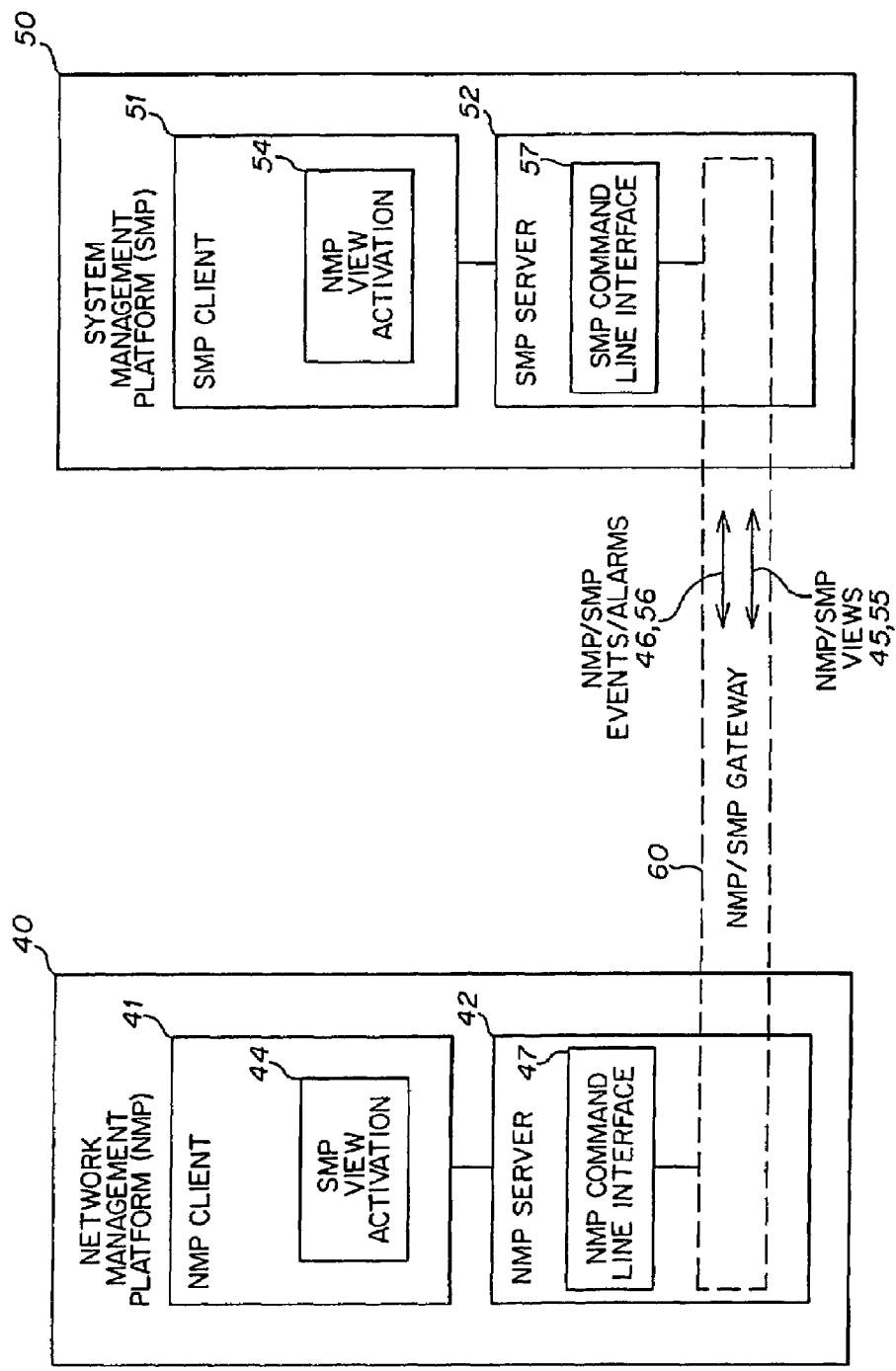
FIG. 5 illustrates an embodiment of the invention in which a gateway provides the sharing of events, alarms, and display views between the network management platform and the system management platform illustrated in FIG. 4.

FIG. 5 illustrates an exemplary embodiment of the invention that facilitates data sharing between the NMP 40 and the SMP 50. In particular, the NMP client 41 includes an SMP view activation module 44, and the SMP client 51 includes an NMP view activation module 54. Each view activation module 44, 54 may be represented by an additional icon displayed on a display of the respective platform. For example, one of the views of the NMP client may display an icon labeled "system management platform view," and allow an administrator to invoke such a view by selecting and activating this icon using a mouse, keyboard, or other interface device, or by controlling a pull-down menu.

In one embodiment, the SMP view is created by invoking an instance of the SMP client 51 from within the NMP 40. In this embodiment, once the SMP view is displayed through the NMP client 41, the administrator may select additional SMP functions and views by selecting icons or providing commands to the SMP server 52 through the SMP view provided on the NMP 40. Similarly, the SMP 50 can provide NMP functions and views via the NMP view activation module 54.

As shown in FIG. 5, the NMP server 42 may include an NMP command line interface 47, and the SMP server 52 may include an SMP command line interface 57. Such command line interfaces 47, 57 allow an external user or device to control aspects of the associated platform by providing specific commands. For example, the NMP server 42 may include many software modules, each of which is usually invoked by one of the other software modules. A command line interface 47 allows a user or external application to enter a command that directly invokes a particular one of these software modules, thus providing interface with external entities.

The embodiment shown in FIG. 5 also includes an NMP/SMP gateway 60, that provides a data path for the NMP/SMP events/alarms 46, 56, as well as for the NMP/SMP views 45, 55. The NMP/SMP gateway interfaces directly with the NMP command line interface 47 and with the SMP command line interface 57. As shown in FIG. 5, the NMP/SMP gateway may reside partially within the NMP server 42, partially within the SMP server 52, and partially external to both the NMP 40 and the SMP 50. However, in different embodiments, the NMP/SMP gateway 60 may reside entirely on one or the other of the platforms, may reside external to both platforms, or any combination thereof.

Figure 6:
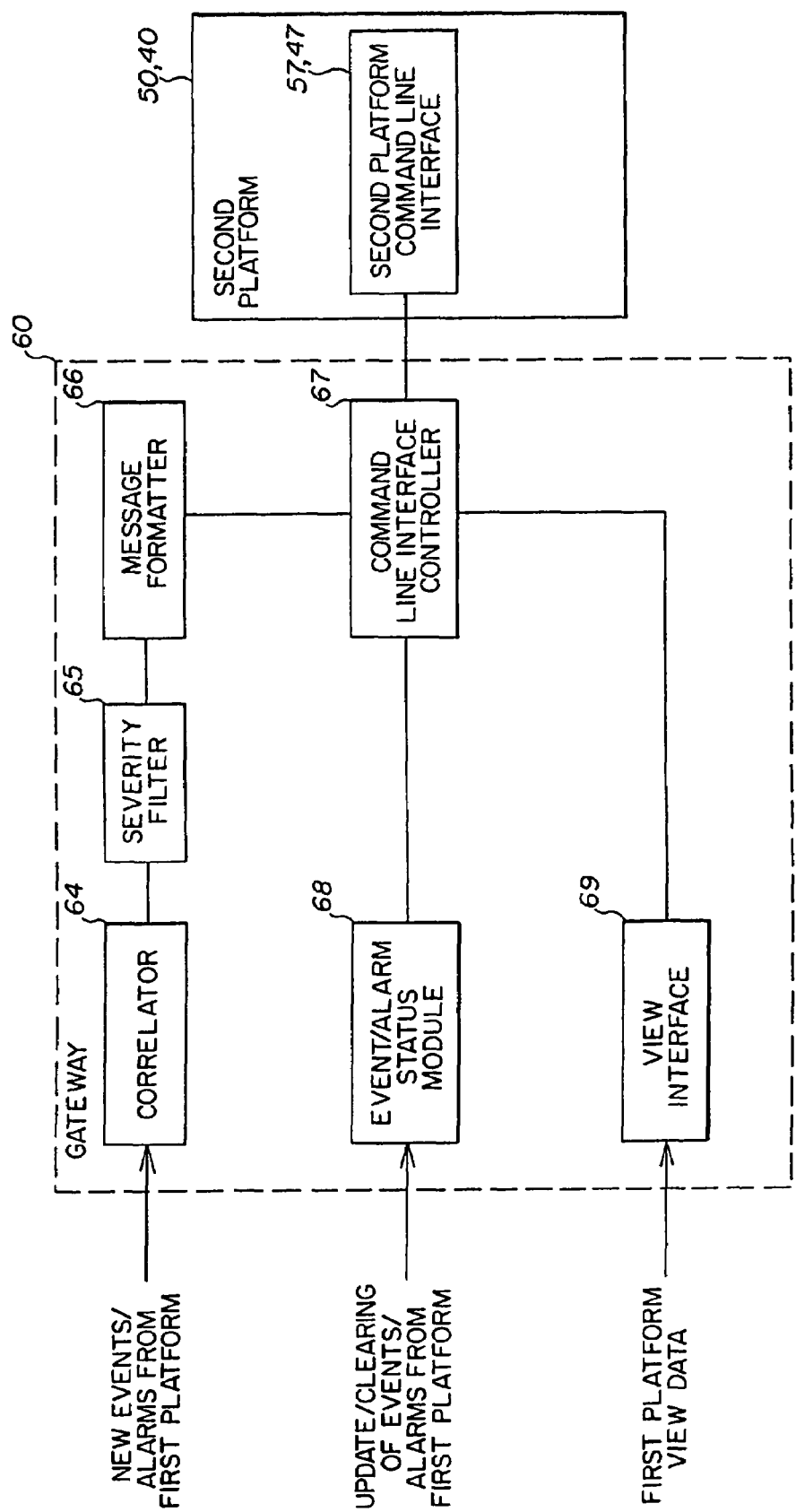
FIG. 6 is a block diagram of an embodiment of the gateway illustrated in FIG. 5.

FIG. 6 is a block diagram of an embodiment of the gateway illustrated in FIG. 5. Such an embodiment includes a correlator 64 coupled to a severity filter 65, which is further coupled to a message formatter 66. This embodiment of the gateway 60 also includes an event/alarm status module 68 and a view interface 69, both of which are coupled to the command line interface controller 67. The command line interface controller 67 is coupled to one of the command line interfaces 47, 57, of one of the platforms 40, 50. In FIG. 6, the platform with the command line interface is referred to as the "second platform," indicative that it is receiving data from a first platform.

In operation, new events or alarms are received from the first platform by the correlator 64. Such events or alarms are correlated by the correlator to determine whether the events or alarms are of interest to the second platform. If so, the events or alarms are passed through the severity filter 65, which filters out less important events or alarms. Then, the message formatter 66 formats the events or alarms into a format that is compatible with the second platform 40, 50. The command line interface 67 invokes a command in the second platform command line interface 57, 47, so that the second platform is notified that a correlated message is available from the first platform. In addition to new events, existing events may be updated or cleared. In particular, the event/alarm status module 68 receives updates or clear information from the first platform, indicative of new information regarding an existing event or alarm. Such information is processed by the event/alarm status module 68 and passed to the command line interface controller 67 for notification of the second platform. Upon receipt of new information, update information, or clear information regarding the network monitored by the first platform, the second platform may correlate such data with its own data as described above. The correlation performed by the second platform 50, 40 is different from the correlation performed by the correlator 64, in that the second platform may use the data from the first platform in combination with data already obtained by the second platform, to perform functions such as fault isolation analysis.

The first platform may also provide platform view data to the view interface 69, for example in response to the NMP view activation 54 being selected, which may cause a view data request to be sent to the view interface 69. After receiving such view data, the view interface 69 provides data to the command line interface controller 67, which in turn notifies the second platform 50, 40 of the available view data. The view data may be in the form of a bitmap file, or any other format which may be displayed by the second platform.

Figure 7:
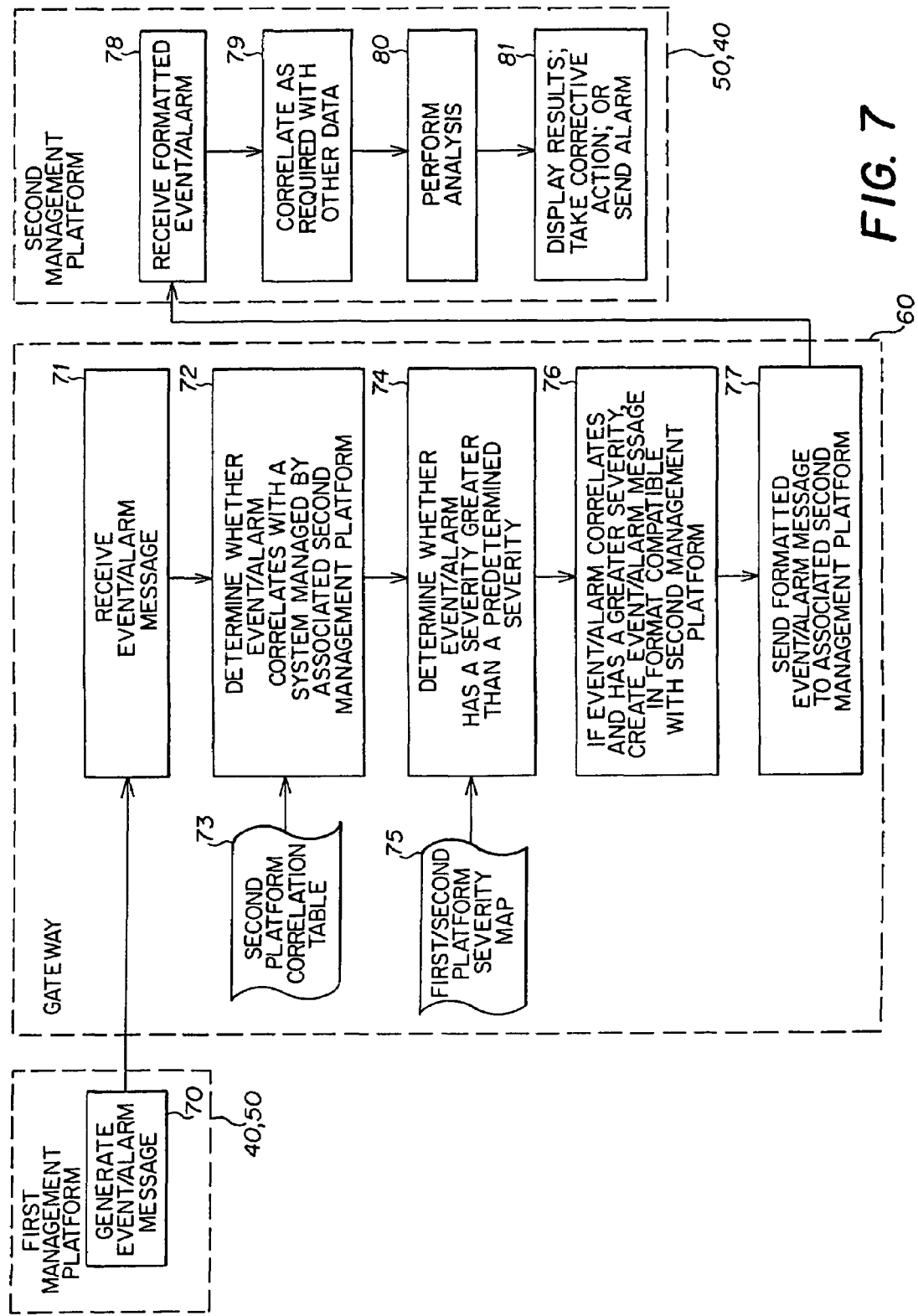
FIG. 7 is a flow diagram depicting steps of a process which may be performed by the embodiment of the gateway shown in FIG. 6.

FIG. 7 is a flow diagram depicting detailed steps of a process performed by the embodiment of the gateway shown in FIG. 6. FIG. 6 shows that step 70 is performed within the first management platform 40, 50, which may be either a system management platform 40 or a network management platform 50. Steps 78–81 are performed within the second management platform 50, 40. Steps 71–77 are performed by a gateway 60, but as discussed above the gateway functions may also be provided within the first or second management platform.

In step 70, the first management platform 40, 50 generates an event or alarm message. Such a message may be a textual version of an alarm as described above with respect to SPECTRUM alarms, or may be any message generated as a result of monitoring a network or system. In step 71, the gateway receives the event or alarm message. The message is correlated to determine whether the associated event/alarm relates to a system that is managed by the second management platform 50, 40 (step 72). Such correlation may use a correlation table 73, which provides a map of events and alarms to systems managed by the second platform 50, 40. An example of such a correlation table 73 is a list of systems managed by the second platform 50, 40, along with an identifier for each system of events, alarms, or other messages which may relate to each respective system on the list. When a message is received, the correlation table 73 may be searched to determine whether the table 73 contains such a message.

If the message does not correlate with any system managed by the second management platform 50, 40, the process may be terminated. If there is a correlation, however, in step 74 it is determined whether the event or alarm has a severity that is greater than a predetermined severity. Such a function may be useful for filtering out less important messages. To support a severity determination, a first/second platform severity map 75 provides an indication of whether a message should be passed or filtered out depending upon the severity of the message. For example, a management platform may associate a severity of either FATAL, CRITICAL, MINOR, or WARNING with each message. The gateway may filter out messages having a severity of either MINOR or WARNING, which represent less severe messages.

Once it is determined that a message correlates with a system managed by the second management platform 50, 40 and has a severity greater than a predetermined severity, a new message is created in step 76, the new message being in a format which is compatible with the second management platform 50, 40. In step 77, the formatted event/alarm message is sent to the second management platform 77. As indicated above, the second management platform 50, 40 may be notified that a formatted message exists via interface with a command line interface. Additionally, to provide the formatted message itself, the gateway may write the formatted message data to memory that is accessible by the second management platform.

In step 72, the second management platform 50, 40 receives the formatted event/alarm message, and in step 70 the formatted message is correlated as required with other data. As described above, the formatted message received from the first management platform 40, 50 may be analyzed in step 80 by the second management platform 50, 40, in conjunction with other data that is already available to the second management platform 50, 40. In step 81, the second management platform may display results, take corrective action, or send an alarm as a result of the analysis performed in step 80. An example of a corrective action taken by an NMP 40 would be to re-route messages to avoid a failed router. An example of corrective action taken by an SMP 50 would be to avoid failed disk space.

Figure 8:
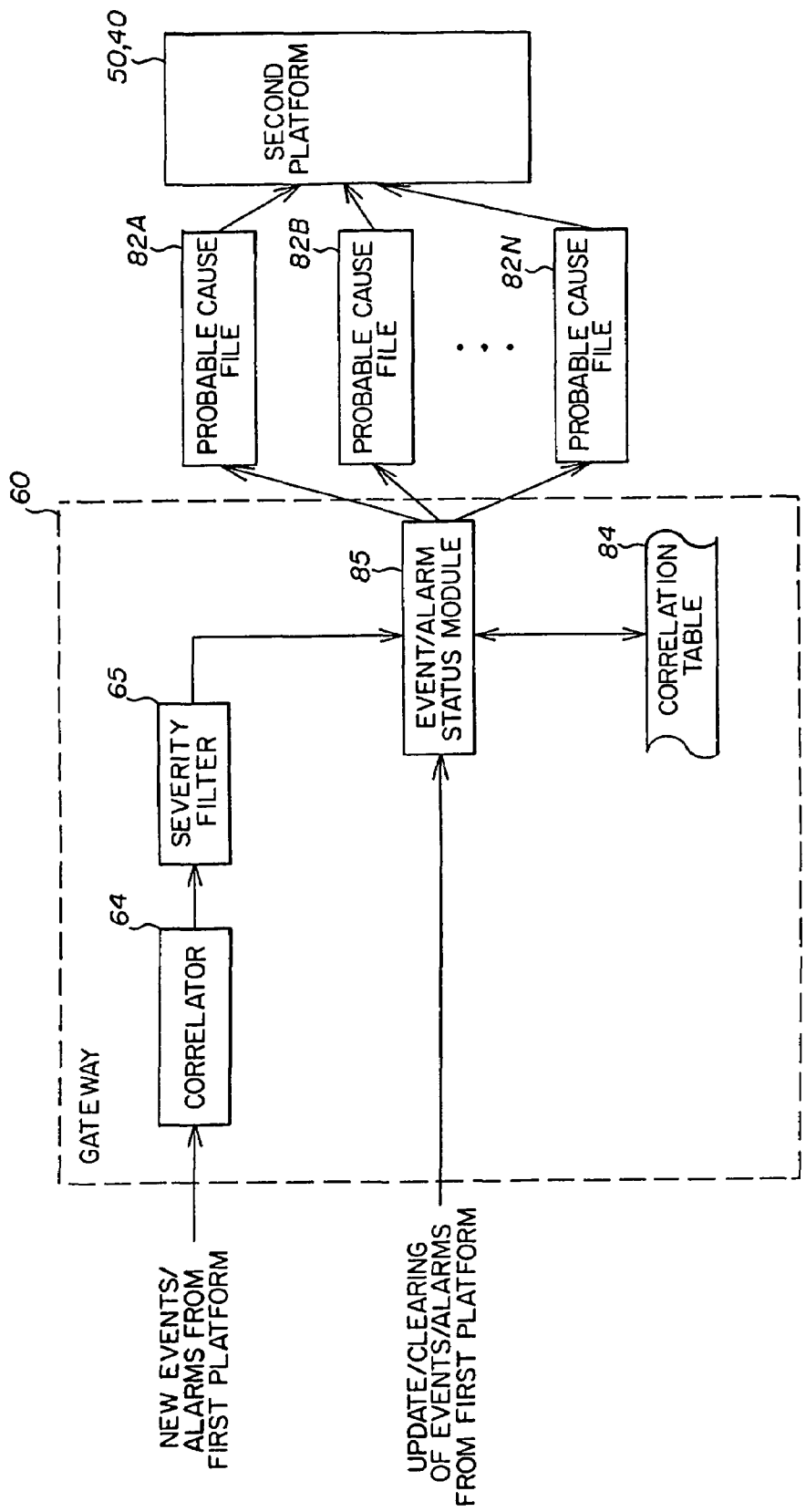
FIG. 8 is a block diagram of another embodiment of the gateway illustrated in FIG. 5, which provides probable cause files associated with each managed entity.

One embodiment of the invention includes a file of related messages that the gateway provides for access by the second management platform 50, 40. Such a file of related messages, referred to as a "probable cause file," is shown in FIG. 8. In particular, FIG. 8 shows portions of the gateway 60 similar to those shown in FIG. 6, but also shows an event/alarm status module 81 that creates such probable cause files. The message formatter 66, command line interface controller 67, and view interface 69 are omitted from the block diagram of FIG. 8 for clarity.

New alarms or events that pass through the correlator 64 and severity filter 65 are provided to the event/alarm status module 81, as is the information relating to update and clearing of existing events and alarms. In response, the event/alarm status module 81 creates and maintains a plurality of probable cause files 82A, 82B, . . . 82N.

In one embodiment, each probable cause file 82 A–N is associated with a particular network entity, for example a server, router or computer. As new events are received that are related to this particular network entity, as determined by the event/alarm status module 81 querying the correlation table 84, the messages relating to the new events may be appended to the probable cause file 82. Thus, the probable cause file contains a history of information relating to the health and performance of the particular network entity. If an update to an event is received by the event/alarm status module 81, then the appropriate entry in the respective probable cause file is updated. Additionally, if a message is received by the event/alarm status module 81 indicating that an event or alarm should be cleared, the contents of the probable cause file 82 may be erased, or a new entry may be made indicating that no problem currently exists.

The correlation table 84 may contain information as described above with respect to the correlation table 73 of FIG. 7, and may also contain additional information. An embodiment of such a correlation table 84 is shown in FIG. 9. In particular, FIG. 9 illustrates that a correlation table 84 may include several entries 97, 98, 99, one for each model. In this example, the term "model" refers to any particular network entity or device monitored by an NMP 40 or SMP 50. The model entries 97, 98, 99 are provided in rows of the correlation table 84. The columns of the correlation table represent information relating to the particular model. Column 90 includes a host name or model name, for example the model name "sparkplug" shown in row 97, and column 91 includes the model name as known by the SPECTRUM NMP. Column 92 gives the IP (Internet Protocol) address of the model. Column 93 provides the probable cause file 82 associated with the model identified in column 90. For example, probable cause file Prob01550000 is associated with the model "sparkplug," and thus contains associated message data as described above. Column 94 provides a cause code indicative of which file to associate with a particular alarm. Other cause codes may be used by SPECTRUM for alarms that are not associated with SMP events or alarms. Column 95 provides a SPECTRUM model handle of the parent group to which the particular model belongs. For example, parent model handle 0xe8004 may identify a subnet to which the model "sparkplug" belongs within the network 10. As shown in FIG. 9, many specific models may belong to a single parent.

From the information provided by the correlation table 84, the event/alarm status module 81 can determine which probable cause file 82 is associated with a particular model, so that the appropriate probable cause file 82 may be updated and maintained. The probable cause files 82A–N may reside in memory that is shared between the gateway 80 and the second platform 50, 40, so that the second platform 50, 40 may access these files.

Figure 10:
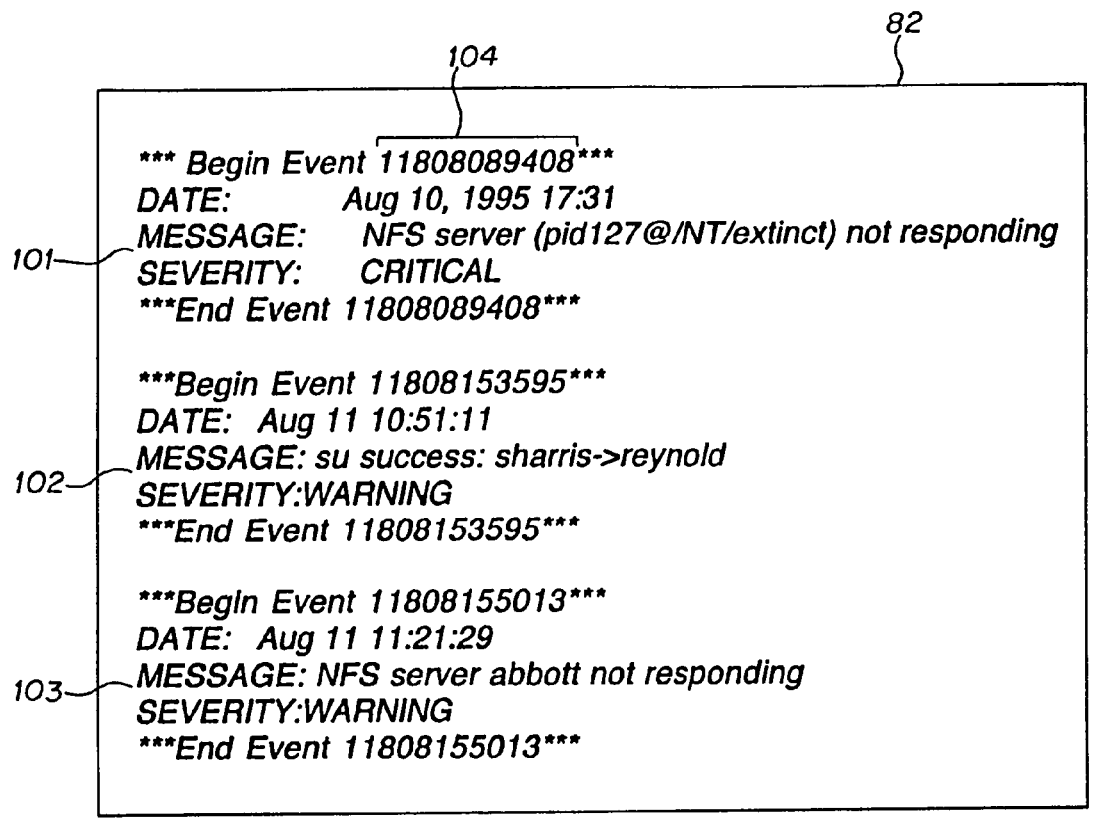
FIG. 10 shows an example of a probable cause file such as that shown in FIG. 8.

FIG. 10 illustrates an example of a probable cause file 82. In this example, three messages 101, 102, 103 have been received and entered by the event/alarm status module. Each entry begins with an event identifier 104. This example of the event identifier 104 includes a concatenation of three separate fields: an event handle which identifies the event; a server handle identifying the server that provided the message; and a date of reception indicative of the date in which the message was received. The date on which the message was written to the probable cause file 82 is also provided, along with the text of the message (describing the effected network entity and problem), and a severity indication. From this data, the second platform 50, 40 may correlate and provide additional analysis as described above.

Figure 11:
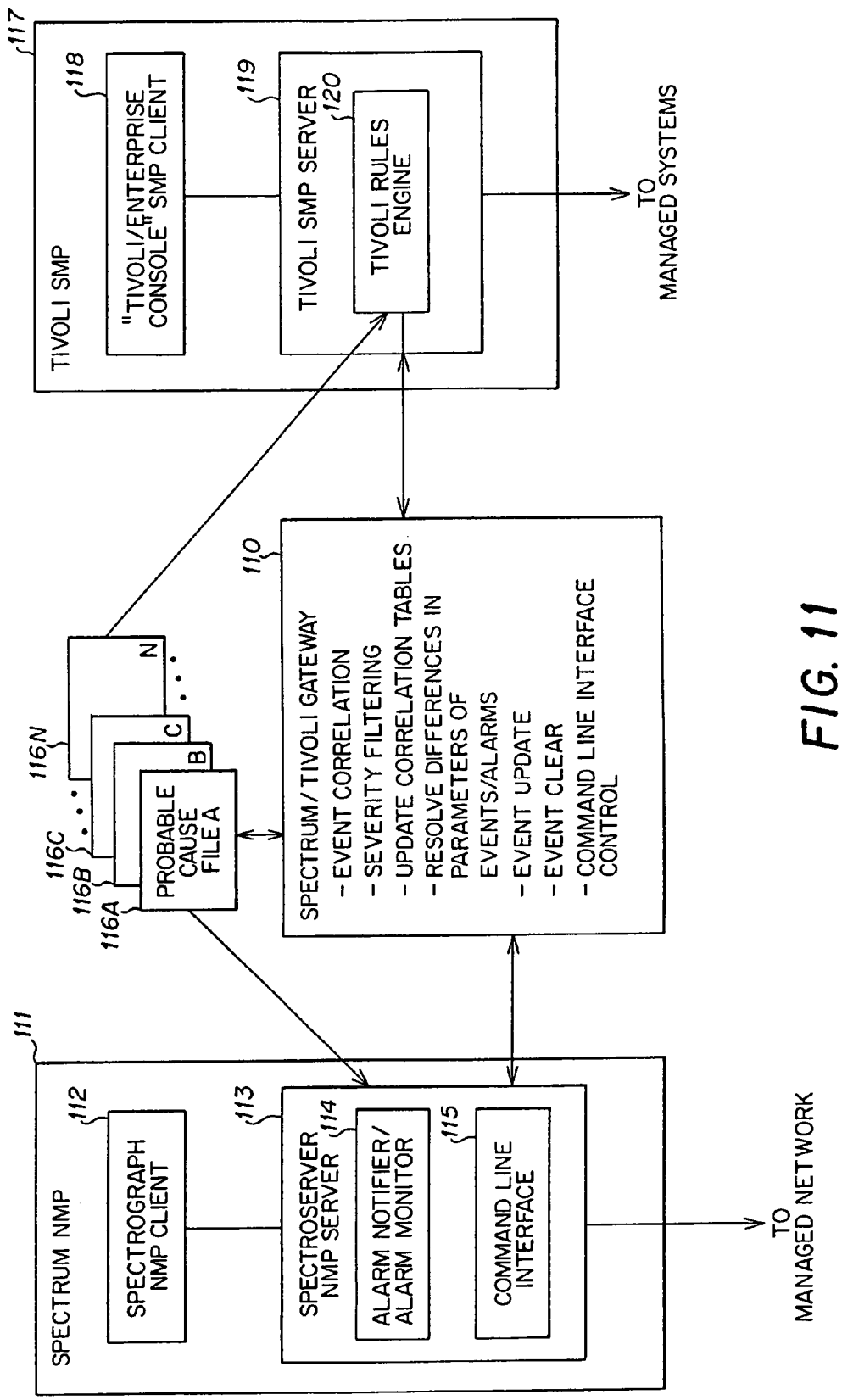
FIG. 11 is a block diagram of an embodiment of the invention in which a gateway provides integration between a SPECTRUM NMP and a Tivoli SMP.

One embodiment of the invention includes a SPECTRUM/Tivoli gateway, which integrates the SPECTRUM NMP with the Tivoli SMP. A block diagram of the SPECTRUM/Tivoli gateway 110 is depicted in FIG. 11.

In particular, the SPECTRUM NMP 111 includes the SPECTROGRAPH NMP client 112 and the SPECTROSERVER NMP server 113, which in turn includes an Alarm Notifier/Alarm Monitor 114 and a Command Line Interface 115. The SPECTROSERVER NMP server 113 interfaces with a managed network as described above, and may include either alarm notifier software or alarm monitor software.

The Tivoli SMP 117 includes "Tivoli/Enterprise Console" SMP client 118 and a Tivoli SMP server 119, which in turn includes a Tivoli Rules Engine 120. The Tivoli SMP Client 118 interfaces with managed systems as described above.

In this embodiment, the gateway 110 includes a collection of executable files to perform the functions described above, including providing the associated probable cause files 116A, 116B, 116C, . . . , 116N. In general, a separate executable file may be provided for each function of the gateway and for each direction in which the data is being passed. For example, one executable file may provide event correlation for events received from the Tivoli SMP server 119, while another executable file may provide event correlation for events and alarms received from the SPECTROSERVER NMP server 113.

In addition to the functions described above, an executable file may be provided to update correlation tables. For example, if a new device is added to the network, a representation of such a new device may be added to the appropriate correlation table. Similarly, representations of devices may be updated and removed. Additionally, in this instance, an executable file may be provided to resolve differences in parameters in the event/alarm messages of each of the servers 113, 119. Generally such a file may be implemented with a number of conditional statements. However, if the parameter differences were complex, then a parameter table may be provided to assist in the difference resolution.

Figure 12:
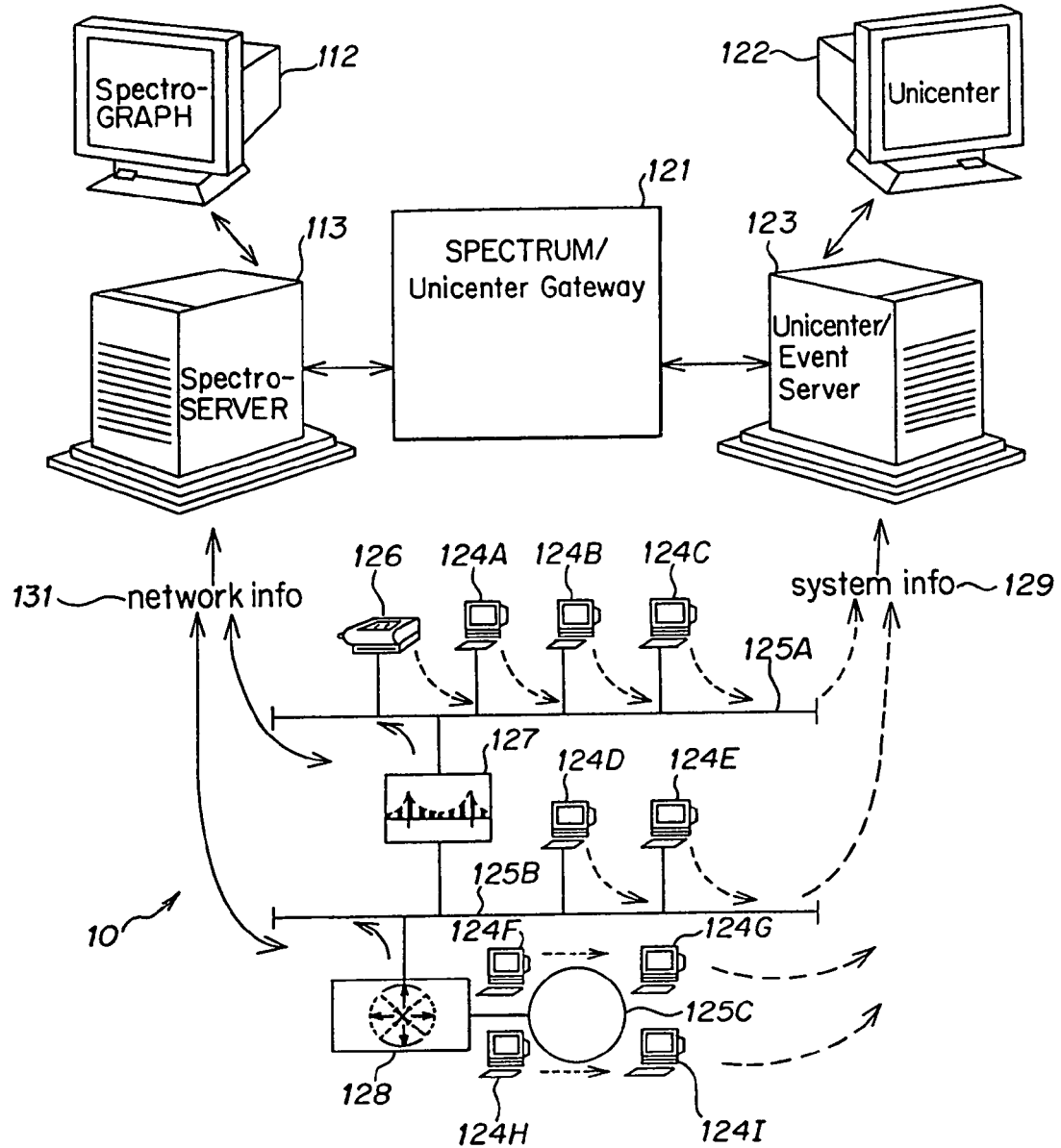
FIG. 12 is a block diagram of an embodiment of the invention in which a gateway provides integration between a SPECTRUM NMP and a Unicenter SMP.

Another embodiment of the invention, shown in FIG. 12, includes a SPECTRUM/Unicenter gateway, which integrates the SPECTRUM NMP with the Unicenter SMP. As with the embodiment described with respect to FIG. 11, the SPECTRUM NMP 111 includes the SPECTROGRAPH NMP client 112 and the SPECTROSERVER NMP server 113. Additionally, the Unicenter SMP may include a Unicenter SMP client 122 and a Unicenter/Event server 123. FIG. 12 also includes a representation of the network 10 including systems monitored by both the SPECTROSERVER NMP server 113 and the Unicenter/Event SMP server 123.

The block diagram of FIG. 12 also provides an example of shared networks and network devices. In particular, the network of FIG. 12 includes computer 124A, computer 124B, computer 124C, printer 126, and bridge 127, all of which are physically connected to linear interface 125A. Bridge 127 is also connected to linear interface 125B, which provides communications among computer 124D, computer 124E, and router 128. Router 128 is also connected to ring interface 125C, which provides communications among computer 124F, computer 124G, computer 124H, and computer 124I.

As described herein, network information 128 is received by the SPECTROSERVER NMP server 113, while system information 129 is received by the Unicenter/Event SMP server 123. The SPECTRUM/Unicenter Gateway 121 provides selective event and alarm sharing between the two servers 113, 123. Additionally, each client may access display data of the other client through menu, icon, or keyboard selections.

The embodiments of the NMP, SMP, and gateway described herein may be implemented in specially-designed hardware such as a state machine or other digital circuitry, or in any of several programming languages on a general purpose computer, or as a programmed general purpose computer itself.

Figure 13:
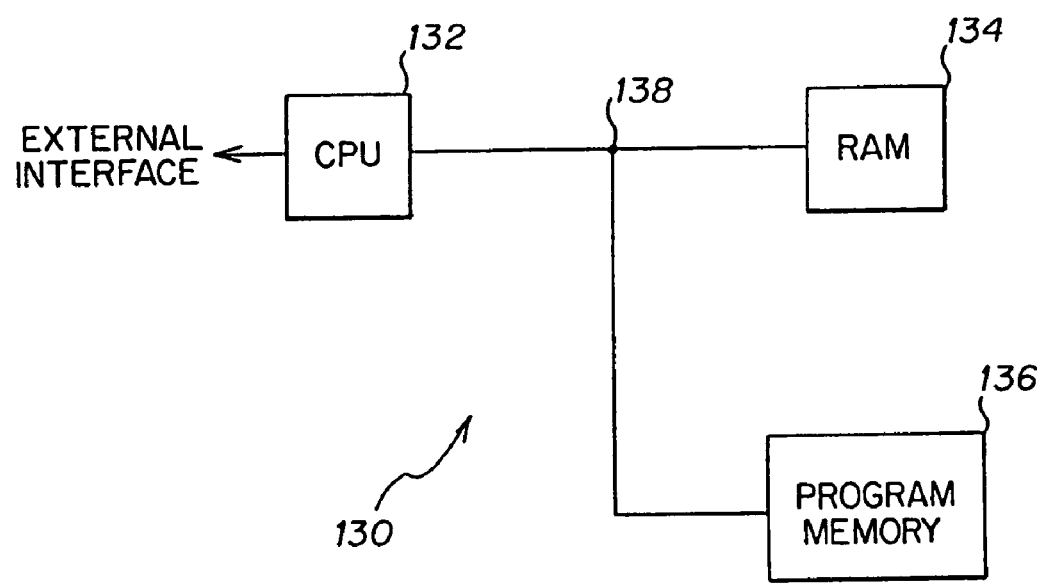
FIG. 13 is a block diagram of a general purpose computer which may be employed to implement embodiments of the invention.

For example, elements of the NMP, SMP, or gateway may be implemented as software on a floppy disk, compact disk, or hard drive, which controls a computer, for example a general purpose computer such as a workstation, a mainframe or a personal computer, to perform steps of the disclosed processes or to implement equivalents to the disclosed block diagrams. Such a general purpose computer 130, shown in FIG. 13, typically includes a central processing unit 132 (CPU) coupled to random access memory (RAM) 134 and program memory 136 via a data bus 138. The general purpose computer 130 may be connected to the network 10 in order to interface with other elements, and may provide commands to devices on the network in order to control the network configuration by an NMP 40 or to control a system managed by an SMP 50.

Alternatively, the elements of the embodiments described herein may be implemented as special purpose electronic hardware. Additionally, in either a hardware or software embodiment, the functions performed by these different elements may be combined in varying arrangements of hardware and software.

Having thus described at least one illustrative embodiment of the invention, various modifications and improvements will readily occur to those skilled in the art and are intended to be within the scope of the invention. Accordingly, the foregoing description is by way of example only, and not intended to be limiting.

What is claimed is:

1. A method for sharing information between a first management system having associated therewith a first set of management information and a second management system having associated therewith a second set of management information, comprising the steps of:
(a) the first management system receiving an event message, the event message indicating occurrence of an event in a network associated with the first management system;
(b) determining whether the event message relates to an entity that is managed by the second management system;
(c) when the event message relates to an entity that is managed by the second management system, formatting the event message in a format compatible with the second management system; and
(d) taking an action to provide the second management system with the event message in the format compatible with the second management system.

2. The method of claim 1, further comprising a step (e) of sending the event message, in the format compatible with the second management system, to the second management system.

3. The method of claim 2, further comprising a step (f) of one of the two management systems providing an analysis based on the formatted event message to determine a further action.

4. The method of claim 1, wherein step (d) comprises a step of holding the formatted event message until requested by the second management system.

5. The method of claim 4, further comprising a step (f) of one of the two management systems providing an analysis based on the formatted event message to determine a further action.

6. The method of claim 1, wherein step (d) comprises a step of pushing the formatted event message until accepted by the second management system.

7. The method of claim 6, further comprising a step (f) of one of the two management systems providing an analysis based on the formatted event message to determine a further action.

8. The method of claim 1, wherein step (d) comprises a step of sending the formatted event message to a component accessible to the first management system and the second management system, the component holds the formatted event message until occurrence of a selected event.

9. The method of claim 8, wherein the component within the first management system comprises a storage device having an area to hold the event message.

10. The method of claim 8, wherein the selected event comprises a request from the first management system.

11. The method of claim 8, wherein the selected event comprises a repeat occurrence of a selected indicia in the message.

12. The method of claim 1, further comprising a step (e) of forwarding a selected portion of the first set of management information to the second management system.

13. The method of claim 1, further comprising the steps of,
(e) maintaining a second set of management information by the second management system; and
(f) providing an analysis based on the first and second sets of management information.

14. The method of claim 1, wherein the event message an occurrence of a predefined event.

15. The method of claim 1, wherein the event message indicates an addition of a network device to a network.

16. The method of claim 1, wherein the event message indicates a removal of a network device from a network.

17. The method of claim 1, wherein the event message indicates a change in a monitored parameter.

18. The method of claim 1, wherein the event message provides a report on a monitored parameter.

19. The method of claim 1, wherein the event message indicates a change in a derived parameter.

20. The method of claim 1, wherein the event message provides a report on a derived parameter.

21. An apparatus for sharing information between a first management system having associated therewith a first set of management information and a second management system having associated therewith a second set of management information, the apparatus comprising:
- first means for receiving an event message from the first management system, the event message indicating occurrence of an event in a network associated with the first management system;
- second means for determining whether the event message relates to an entity that is managed by the second management system;
- third means for formatting the event message in a format compatible with the second management system when the event message relates to an entity that is managed by the second management system; and
- fourth means for taking an action to provide the second management system with the event message in the format compatible with the second management system.

22. The apparatus of claim 21, further comprising fifth means for sending the event message in the format compatible with the second management system to the second management system.

23. The apparatus of claim 21, wherein the fourth means holds the formatted event message until requested by the second management system.

24. The apparatus of claim 21, wherein the fourth means pushes the formatted event message until accepted by the second management system.

25. The apparatus of claim 21, wherein the fourth means sends the formatted event message to a component accessible to the first management system and the second management system to hold until the first management systems requests the message.

26. The apparatus of claim 25, wherein the component within the first management system comprises a storage device having an area to hold the formatted event message.

27. The apparatus of claim 21, further comprising a fifth means for maintaining the first set of management information associated with the first management system.

28. The apparatus of claim 27, further comprising a sixth means for forwarding the first set of management information to the second management system.

29. The apparatus of claim 27, further comprising,
- sixth means for maintaining the second set of management information associated with the second management system; and
- seventh means for providing an analysis based on the first and second sets of management information.

30. The apparatus of claim 21, further comprising a fifth means for maintaining the second set of management information associated with the second management system.

31. The apparatus of claim 21, wherein the first management system comprises one of a network management system, a system management system or an element management system.

32. The apparatus of claim 21, wherein the second management system comprises one of a network management system, a system management system or an element management system.

33. A system for providing an interface between a first management system having associated therewith a first set of management information and a second management system having associated therewith a second set of management information, comprising:
- a correlator, having an input that receives an event message from the first management system indicating an occurrence of an event in a network associated with the first management system, and an output that provides a correlated event message when the event message is related to an entity managed by the second management system;
- a message formatter, coupled to the correlator, having an input that receives the correlated event message and an output that provides a formatted event message in a format that is compatible with the second management system; and
- an interface module, coupled to the correlator and the second management system, the interface module taking a selected action should the correlator output the correlated event message.

34. The apparatus of claim 33, wherein the action taken by the interface module comprises holding the formatted message until requested by the second management system.

35. The apparatus of claim 33, wherein the action taken by the interface module comprises pushing the formatted message until accepted by the second management system.

36. The apparatus of claim 33, wherein the action taken by the interface module comprises sending the formatted message to a component within the first management system to hold until the first management systems requests the formatted message.

37. The apparatus of claim 36, wherein the component within the first management system comprises a storage device having an area addressable by the second management system.

* * * * *